United States Patent [19]
Tou et al.

[11] Patent Number: 6,032,163
[45] Date of Patent: Feb. 29, 2000

[54] METHOD AND APPARATUS FOR REFORMATTING PARAGRAPHS ON A COMPUTER SCREEN

[75] Inventors: Frederich N. Tou, Cupertino; Donna M. Auguste, East Palo Alto, both of Calif.

[73] Assignee: Apple Computer, Inc., Cupertino, Calif.

[21] Appl. No.: 08/134,214

[22] Filed: Oct. 8, 1993

[51] Int. Cl.[7] .................................................. G06F 17/24
[52] U.S. Cl. ........................................ 707/531; 707/541
[58] Field of Search ................... 395/146, 155; 707/531, 541

[56] References Cited

U.S. PATENT DOCUMENTS

| | | | |
|---|---|---|---|
| 5,220,649 | 6/1993 | Forcier | 395/146 |
| 5,231,698 | 7/1993 | Forcier | 395/146 |
| 5,262,948 | 11/1993 | Kato | 395/146 |

OTHER PUBLICATIONS

O'Connor, Rory J., "Apple Banking on Newton's Brain", Apr. 22, 1992, San Jose Mercury News.

Weiman, Liza and Moran, Tom, "A Step Toward the Future", Aug. 1992, Macworld Magazine.

Soviero, Marcelle M., "Your World According to Newton", Sep. 1992, Popular Science Magazine.

Abatemarco, Fred, "From the Editor", Sep. 1992, Popular Science Magazine.

Baumgarten et al., *Using WordPerfect 5.1®, Special Edition*, Que Corporation, 1989, pp. 72–75, 80,82, 89–90,88, 115, 487,490,571–577, 693, 305–343.

*Primary Examiner*—Stephen S. Hong
*Attorney, Agent, or Firm*—Beyer & Weaver, LLP

[57] ABSTRACT

A method for reformatting alphanumeric objects displayed on a screen of a pen computer system including the steps of: (a) selecting a plurality of objects to be reformatted; (b) removing object breaks from between the objects; and (c) reformatting the objects without the removed object breaks. The alphanumeric objects typically comprise a number of words separated by object breaks such as carriage returns, tabs, and paragraph breaks. The process of the present invention removes such object breaks and replaces them with spaces prior to reflowing the word objects between a left margin and a right margin. An apparatus for reformatting alphanumeric objects of the present invention includes a digital process (CPU), memory coupled to the CPU, a screen coupled to the CPU, and a plurality of alphanumeric objects stored in the memory and displayed on the screens. The apparatus further includes a user input mechanism coupled to the CPU for selecting a plurality of alphanumeric objects, a mechanism for removing object breaks from between the selected objects, and a mechanism for reformatting the selected objects without the removed object breaks.

8 Claims, 15 Drawing Sheets

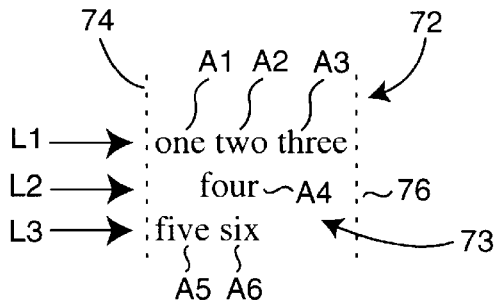
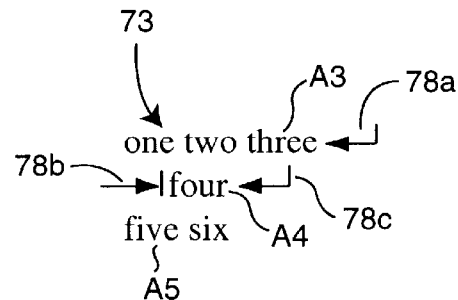
Figure 3a   Figure 3b
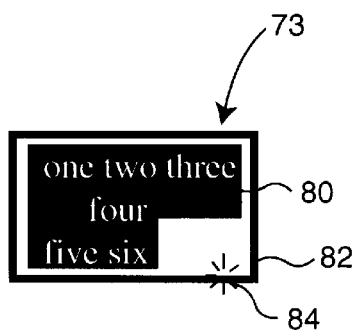
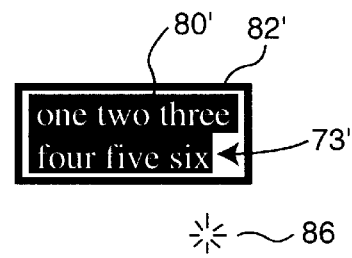
Figure 3c   Figure 3d
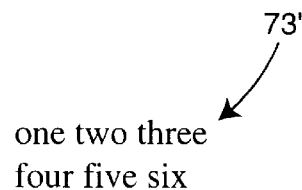
Figure 3e

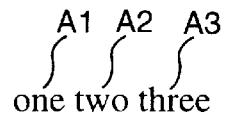
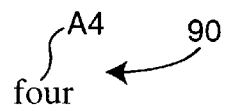
Figure 4a
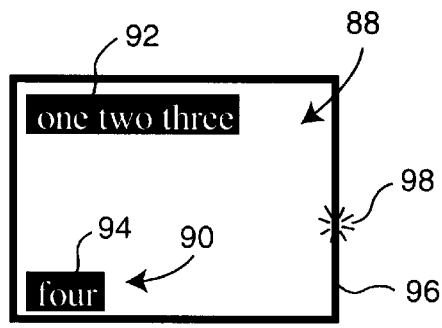
Figure 4b
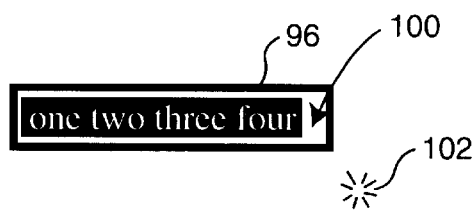
Figure 4c
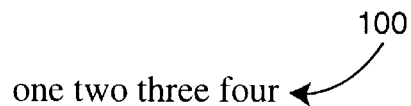
Figure 4d

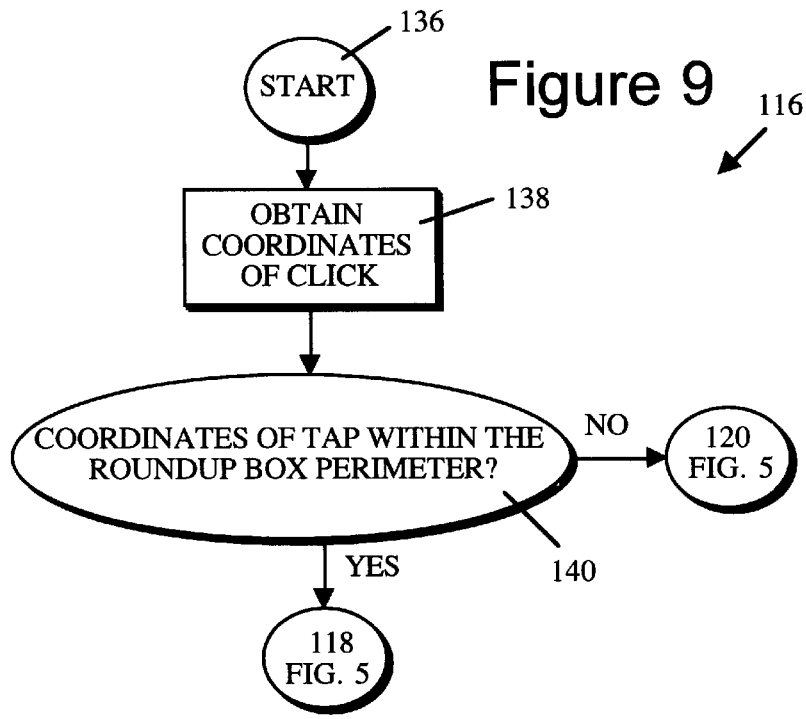
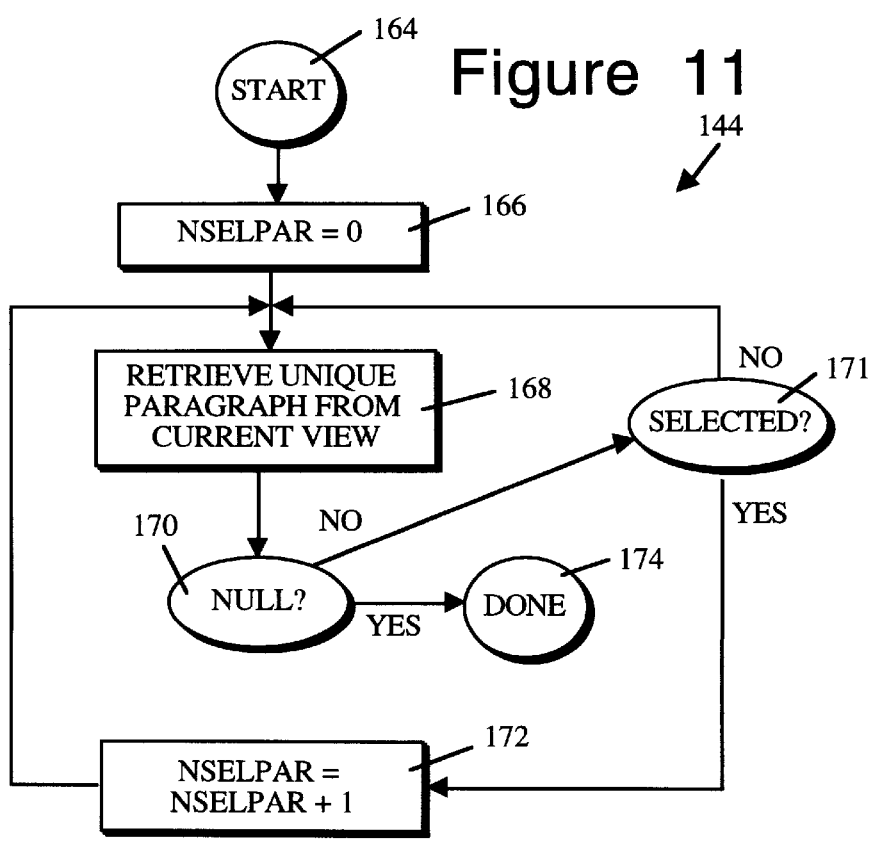

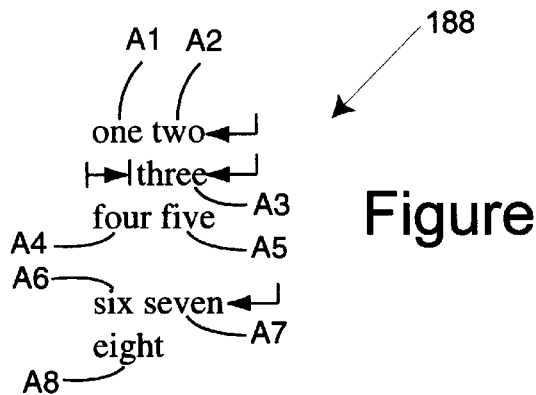
Figure 13a
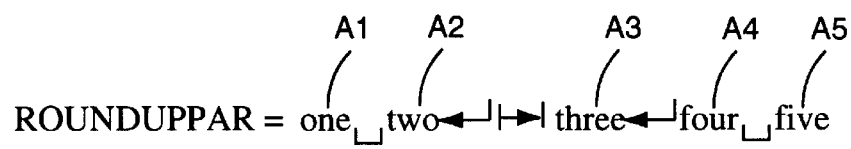
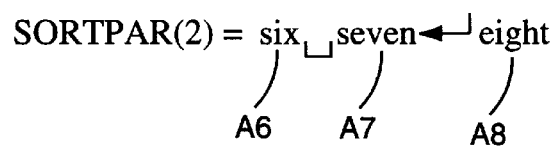
Figure 13b
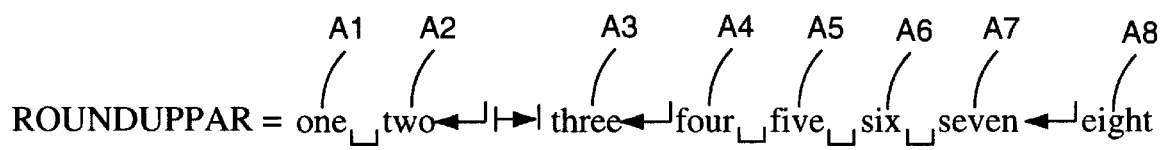
Figure 13c
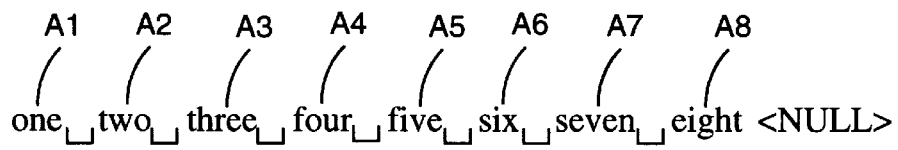
Figure 14

METHOD AND APPARATUS FOR REFORMATTING PARAGRAPHS ON A COMPUTER SCREEN

BACKGROUND OF THE INVENTION

The present invention relates generally to computer systems, and more particularly to computer implemented word processors and text editors.

Computerized personal organizers are becoming increasingly popular with a large segment of the population. Computerized personal organizers tend to be small, lightweight, and relatively inexpensive, and can perform such functions as keeping a calendar, an address book, a to-do list, etc. While many of these functions can also be provided in conventional computer systems, personal organizers are very well suited to the personal organization task due to their small size and portability. Personal organizers are available from such companies as Sharp and Casio of Japan.

A relatively new form of computer, the pen-based computer system, holds forth the promise of a marriage of the power of a general purpose computer with the functionality and small size of a personal organizer. A pen-based computer system is typically a small, hand-held computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion.

It is often desirable to be able to reformat words, numbers, and the combination of the two ("alphanumeric objects" or "words" as used herein) that are entered into a pen computer system. For example, a user may wish to "round-up" words on the screen of the pen computer system to form a compact paragraph. This is particularly useful in pen computer systems having word recognizers which may insert carriage returns, tabs, and paragraph breaks automatically (and inadvertently) between alphanumeric word objects. In the prior art, it has not been possible to quickly and easily compact such alphanumeric objects into a contiguous paragraph form.

SUMMARY OF THE INVENTION

The present invention provides the ability to quickly and easily compact alphanumeric objects displayed on the screen of a pen computer system into a compact and contiguous paragraph. The process and apparatus of the present invention thus permits a user to quickly reformat text by removing superfluous carriage returns, tabs, paragraph breaks and the like.

A method for reformatting objects displayed on the screen of a computer in accordance with the present invention includes the steps of: (a) selecting a plurality of objects to be reformatted; (b) removing object breaks from between the objects; and (c) reformatting the objects without the removed object breaks. Preferably, the plurality of objects include a plurality of alphanumeric objects comprising words, numbers, and a combination of characters and numbers, also referred to herein generically as "words." The object breaks typically include carriage returns, tabs, and paragraph breaks. Preferably, the reformatting step reflows the alphanumeric objects between a left margin and a right margin.

The present invention can also be characterized as a computer-implemented process for compacting alphanumeric objects displayed on a computer screen. The computer-implemented process includes the steps of selecting a plurality of alphanumeric objects on a computer screen, replacing word breaks between the alphanumeric objects with spaces, and reflowing the plurality of alphanumeric objects between a left margin and a right margin. Preferably, the computer-implemented process also includes the step of sorting the alphanumeric objects after selecting the objects and before replacing word breaks with spaces. In the present invention, the primary sort preference of the objects is from top-to-bottom on the screen with a secondary preference from left-to-right on the screen. The process also preferably includes the step of forming the alphanumeric objects into a string in conjunction with the replacing step for use by the reflowing step.

The reflowing step of the computer-implemented process preferably comprises the steps of: (a) assigning a current line position; (b) assigning a left margin pointer to a first character of a first alphanumeric object of the string; (c) determining the portion of the string which falls between the left margin and the right margin with no alphanumeric object overlapping the right margin when the left margin pointer is aligned with the left margin; (d) placing the portion of the string along the current line portion between the left margin and the right margin; (e) iterating the current line position; (f) resetting the left margin pointer to a first character of a first alphanumeric object after the portion of the string determined by step (c); and (g) repeating steps (c)–(f) until the entire string has been flowed between the left margin and the right margin.

An apparatus for reformatting alphanumeric objects on a computer screen in accordance with the present invention includes a processor (CPU), memory coupled to the CPU, a screen coupled to the CPU, and a plurality of alphanumeric objects stored in the memory and displayed on the screen. The apparatus further includes a user input mechanism (such as a stylus and tablet of a pen computer system) which is coupled to the CPU for selecting a plurality of alphanumeric objects, a mechanism for removing object breaks from between the selected objects, and a mechanism for reformatting the selected objects without the removed object breaks. The object breaks preferably include carriage returns, tabs, and paragraph breaks. The apparatus of the present invention also preferably includes a mechanism for inserting a space between adjacent alphanumeric objects, and the reformatting mechanism preferably reflows the spaced objects between a left margin and right margin.

The method and apparatus of the present invention thus provide for the simple and convenient compacting or "rounding-up" of alphanumeric objects on a computer screen. As such, the reformatting of paragraphs, particularly paragraphs of words on a pen-based computer system, is very much simplified.

These and other advantages of the present invention will become apparent upon reading the following detailed descriptions and studying the various figures of the drawings.

BRIEF DESCRIPTION OF THE DRAWINGS

FIG. 3a illustrates six alphanumeric objects which may be displayed on screen 52 of the pen computer system 10;

FIG. 3b illustrates the six alphanumeric objects with the hidden object breaks;

FIG. 3c illustrates the six alphanumeric objects after selection;

FIG. 3d illustrates the six alphanumeric objects after compaction;

FIG. 3e illustrates the six alphanumeric objects after de-selection;

FIG. 4a illustrates four alphanumeric objects which have been formed into two paragraphs which may be displayed on screen 52 of computer 10;

FIG. 4b illustrates the four alphanumeric objects of FIG. 4a after selection;

FIG. 4c illustrates the four alphanumeric objects after compaction;

FIG. 4d illustrates the four alphanumeric objects of FIG. 4c after de-selection;

FIG. 9 is a flow diagram illustrating the "COMPACT EVENT?" step of FIG. 5;

FIG. 11 is a flow diagram illustrating the "SELECT WORDS" step of FIG. 5;

FIGS. 13a–13c are used to illustrate the "APPEND SORTPAR(i)" step of FIG. 10;

FIG. 14 is used to illustrate the "REPLACE BREAKS WITH SINGLE SPACES" step of FIG. 10;

DETAILED DESCRIPTION OF THE PREFERRED EMBODIMENTS

The present invention is well suited for pointer based computer systems such as the pen-based, pen-aware and mouse controlled systems that are currently popular. For the purposes of illustration, the invention will be described in connection with a pen-based system.

Figure 1:
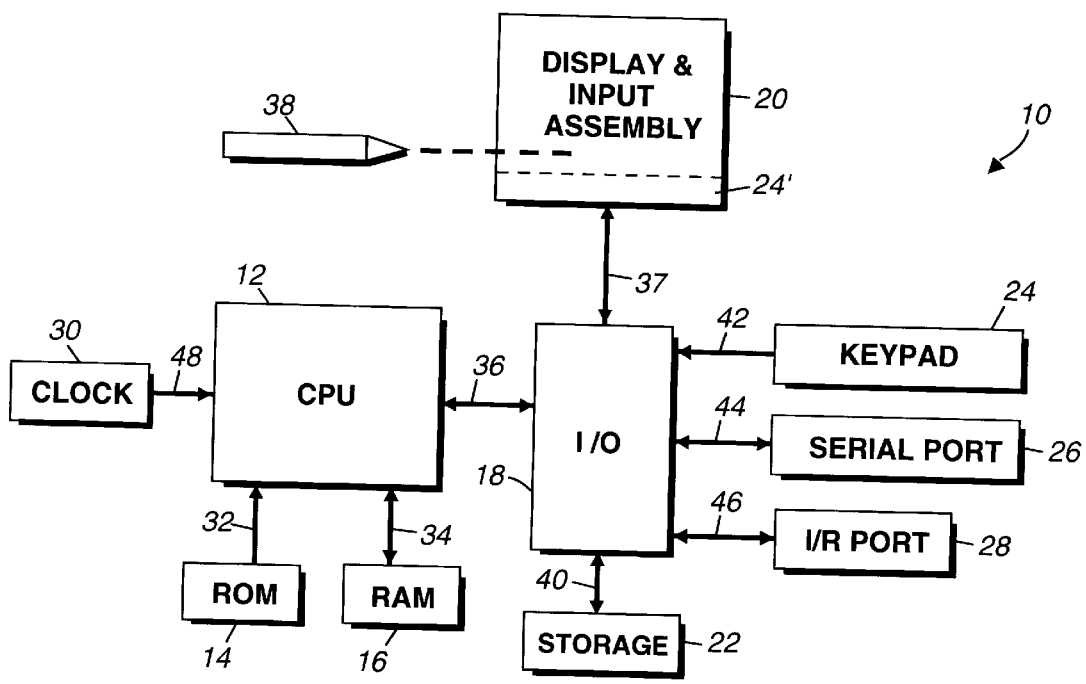
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22, a keypad (or keyboard) 24, a serial port 26, an infrared (I/R) port 28, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 32. ROM 14 preferably contains the basic operating system for the pen-based computer system 10. CPU 12 is connected to RAM 16 by a bi-directional data bus 34 to permit the use of RAM 16 as scratch pad memory. ROM 14 and RAM 16 are also coupled to CPU 12 by appropriate control and address busses, as is well known to those skilled in the art. CPU 12 is coupled to the I/O circuitry 18 by bi-directional data bus 36 to permit data transfers with peripheral devices.

I/O circuitry 18 preferably includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and I/R port 28.

Display assembly 20 of pen-based computer system 10 is both an input and an output device. Accordingly, it is coupled to I/O circuitry 18 by a bi-directional data bus 37. When operating as an output device, the display assembly 20 receives data from I/O circuitry 18 via bus 37 and displays that data on a suitable screen. The screen for display assembly 20 is preferably a liquid crystal display (LCD) of the type commercially available from a variety of vendors. The input device of display assembly 20 is preferably a thin, clear membrane which covers the LCD display and which is sensitive to the position of a stylus 38 on its surface. With such a structure, the membrane of the display assembly 20 can serve as an input "tablet." These position sensitive membranes are also readily available on the commercial market. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a PCMCIA card, or the like.

Figure 2:
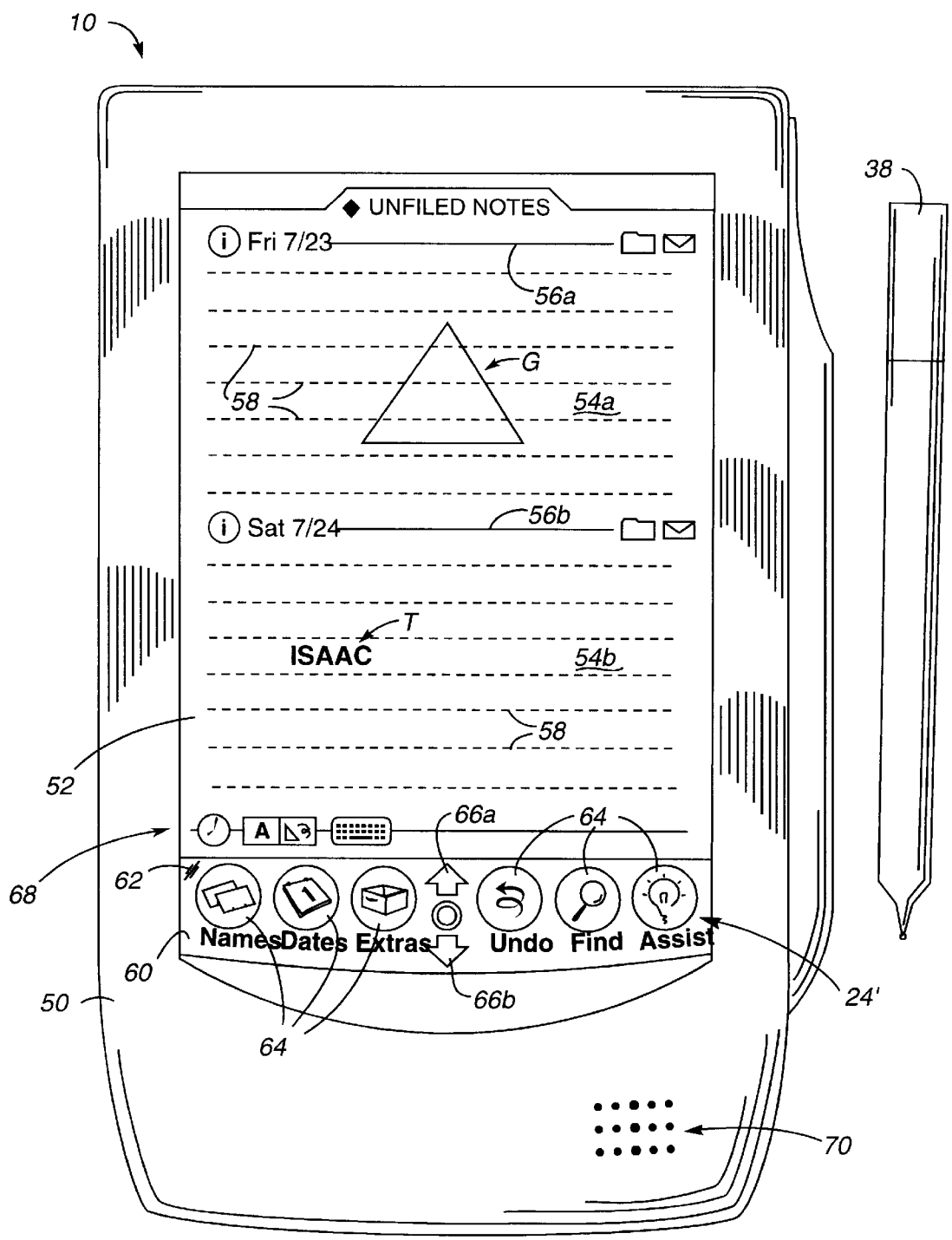
FIG. 2 is a top plan view of the screen, case, keypad, and stylus of the computer system of FIG. 1.

The keypad 24 can comprise an array of mechanical buttons or switches coupled to I/O circuitry 18 by a data bus 42. Alternatively, keypad 24 can comprise an entire, standard QWERTY keyboard. In the present embodiment, a separate keypad 24 is not used in favor of a "pseudo" keypad 24'. This "pseudo" keypad 24' comprises "button" areas which are associated with a bottom edge of the tablet membrane that extends beyond the lower edge of the LCD display. These button areas are defined by a printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 37 and I/O 18. An example of pseudo keypad 24' is shown in FIG. 2.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Serial port 26 is coupled to I/O circuitry by a bi-directional bus 44. The serial port 26 can be used to couple the CPU to external devices and networks.

Infrared (I/R) port 28 is coupled to I/O circuitry by a bi-directional bus 46. The I/R port can be used for outgoing information (e.g. to control a printer or some other external device, or to communicate with other computer systems) or for incoming information from other computers or devices.

Clock 30 preferably comprises a real-time clock to provide real-time information to the system 10. Alternatively, clock 30 can simply provide regular clock pulses to, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 37 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 37 to produce appropriate images on the screen portion of the display assembly 20.

In FIG. 2, the pen-based computer system 10 of FIG. 1 is shown housed within a generally rectangular enclosure 50.

The CPU 12, ROM 14, RAM 16, I/O circuitry 18, and clock 26 are preferably fully enclosed within the enclosure 50. The display assembly 20 (FIG. 1) is mostly enclosed within the enclosure 50, but a viewing screen 52 of the display assembly is exposed to the user. As used herein, the term "screen" will refer to the portion of the display assembly 20 which can display an image that can be viewed by a user. Also accessible to the user is the pseudo keypad 24' that was described with reference to FIG. 1.

Upon power-up, pen based computer system 10 displays on screen 52 an initial "note" area 54a including a header bar 56a and a number of guidelines 58. The header bar 56a preferably includes the date of creation of the note area 54a and a number of icons and "soft" buttons, not particularly germane to the discussion of the present invention. For this reason, the header bar 56a will not be discussed in detail herein. The optional guidelines 58 aid a user in entering text, graphics, and data into the pen-based computer system 10. A graphic object G in the form of a triangle is shown entered within note area 54a.

Additional note areas, such as a note area 54b, can be formed by the user by drawing a substantially horizontal line across the screen 52 with the stylus 38. The substantially horizontal line is recognized by the system 10 and is converted into a second header bar 56b. Additional text, graphical, and other data can then be entered into this second note area 54b. For example, the text object T comprising "ISAAC" has been entered into second note area 54b.

In this preferred embodiment, the keypad 24', as explained previously, comprises a printed or silk-screened member 60 provided beneath a lower edge of a thin, clear, stylus-sensitive membrane 62 of the input "tablet." Alternatively, a keypad could comprise a mechanical keypad (or keyboard) 24, or a keypad could comprise "soft buttons" i.e. images generated at convenient locations on the screen 52, in which case a "button" would be activated by touching the stylus to the screen over the image of the button. The keypad 24' preferably includes a number of dedicated function buttons 64 and a pair of scroll buttons 66a and 66b. The operation of the note areas 54a, 54b, etc., scroll buttons 66a and 66b, and other aspects of computer system 10 are discussed in greater detail in co-pending U.S. patent application Ser. No. 07/868,013, filed Apr. 13, 1992 on behalf of Tchao et al., assigned to the assignee of the present invention and incorporated herein by reference in its entirety.

The screen illustrated in FIG. 2 is referred to as the "notepad", and is preferably an application program running under the operating system of the pen based computer system 10. In this preferred embodiment, the notepad is a special or "base" application which is always available beneath higher level applications. The notepad application, like other applications, run within a window, which in this instance comprises the entire viewing screen 52. Therefore, as used herein, a "window" is the entire screen or any portion of an entire screen which is dedicated to a particular application program.

A status bar 68 is provided at the bottom of the notepad application. The status bar 68 is provided with a number of active and display areas, which again are not particularly germane to the present invention and will therefore not be discussed in detail herein. U.S. patent application Ser. No. 07/976,970 filed Nov. 16, 1992 on behalf of Foster et. al, entitled "Status Bar for Application Windows" and assigned to the assignee of the present invention describes how to make and use the status bar, and is incorporated herein by reference in its entirety.

The enclosure 50 is preferably provided with apertures 70 which permit the free transmission of sound from a speaker (not shown) which is housed within enclosure 50. The speaker can be driven by the CPU 12, by I/O circuitry 18, or by specialized sound chips, as is well known to those skilled in the art. The speaker can be used to provide user feed-back, or to transmit audible information to a user.

The term "object" will be used extensively in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and alphanumeric (i.e. word) objects. There are many well known texts which describe object oriented programming. See, for example, *Object Oriented Programming for the Macintosh,* by Kurt J. Schmucher, Hayden Book Company, 1986.

In the present invention, objects are preferably implemented as part of a frame system that comprises frame objects related by a semantic network. A description of semantic networks can be found in "A Fundamental Tradeoff in Knowledge Representation and Reasoning", *Readings in Knowledge Representation,* by Brachman and Leveseque, Morgan Kaufman, San Mateo, 1985.

It will be noted there is a liberal use of graphic elements in the present invention. For example, the header bars 56*a* and 56*b* include lines and other graphical elements. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book *Inside Macintosh, Volumes I, II, and III,* by C. Rose et al., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 52 forms a first or "root" layer, with the status bar 68, for example, positioned in a second layer "over" the root layer. The various buttons of the status bar 68 are positioned in a third layer "over" the second and root layers. The view system automatically handles "taps", "clicks" and other gestures of the stylus 38 on the screen 52 by returning information concerning the tap, click or other gesture and any object to which it may be related. Again, the status bar 68 and the view system are described in greater detail in copending U.S. patent application Ser. No. 07/976,970, which has been incorporated herein by reference.

The object oriented programming and view system software makes the implementation of the processes of the present invention less cumbersome than traditional programming techniques. However, the processes of the present invention can also be implemented in alternative fashions, as will be well appreciated by those skilled in the art.

In FIG. 3*a,* a sample of text 72 which may appear on viewing screen 52 of the present invention includes six alphanumeric objects A1–A6. In this example, alphanumeric object A1 is the word "one", alphanumeric object A2 is the word "two", etc.

As used herein, the term "alphanumeric object" will be used to designate word-type objects displayed on screen 52, and will be used, at times, synonymously with "word." These word-type objects can include characters of the alphabet, ordinal numbers (1, 2, 3 . . . ), or a mixture of the two. For example, "one", "1993", and "R2D2" are all considered alphanumeric objects or words within the meaning of the present invention. It is also within the scope of this invention that other character types, such as Greek alphabet letters and punctuation (such as a hyphen) can also form part or all of an alphanumeric object. Therefore, as used herein, "alphanumeric object" or "word" will comprise one or more characters of any type that are delimited in some fashion from adjacent alphanumeric objects or words or which can be treated, at least to some extent, in a word-like fashion.

As seen in FIG. 3*a,* the alphanumeric objects A1–A6 are formed in three lines L1, L2, and L3. Thus, the six alphanumeric objects A1–A6 comprise a rough "paragraph" 73. This paragraph includes a left margin 74 and a right margin 76, where line L1 is the first line of the paragraph 73 and line L3 is the last line of the paragraph 73.

In FIG. 3*b,* several normally hidden object breaks 78*a,* 78*b,* and 78*c* are illustrated. These object breaks separate the alphanumeric objects and provide a desired formatting of the paragraph 73. For example, object breaks 78*a* and 78*c* are "carriage return" breaks while object break 78*b* is a "tab" break. A carriage return break causes the next alphanumeric object to be shown on the next line of the paragraph. A tab break causes the next alphanumeric object to be "tabbed" over to the next tab position (e.g. 3–5 spaces). In the example of FIG. 3*b,* alphanumeric object A3 is separated from alphanumeric object A4 by two object breaks, namely the carriage return object break 78*a* and the tab object break 78*b*. Alphanumeric objects A4 and A5 are separated by a single object break 78*c.*

In FIG. 3*c,* the paragraph 73 has been "selected" by an appropriate method. There are many methods for selecting objects such as the alphanumeric objects A1–A6, and a preferred method will be discussed with reference to FIG. 7. In the present invention, selection will "highlight" the selected alphanumeric objects in the paragraph 73 as indicated by the reverse video 80, and will also place a border 82 around the reverse video section 80. The border 82 will also, at times, be referred to as the "bounding box" for the selected paragraph, and as the "round-up box" for the paragraph. As used herein, "highlight" or "highlighting" refers to any visual modification of the alphanumeric objects or their environment which makes it visually apparent that they have been selected for a formatting operation, where the reverse video 80 is merely one example of such a highlighting process.

The method and apparatus of the present invention are operative to "round-up" or compact alphanumeric objects into a more compact paragraph format. A first step in accomplishing this task is the selection of the alphanumeric objects to be compacted, as was illustrated in FIG. 3*c.* A second step in the process is to indicate to the computer system 10 that the selected alphanumeric objects are to be compacted. In the present invention, this is accomplished by "clicking" anywhere on the border 82 surrounding the alphanumeric objects with the stylus 38, as illustrated at "clicking" point 84. As used herein, "clicking" refers to the operation of engaging the tip of stylus 38 with the screen 52 and then quickly removing the tip of the stylus from the screen.

The step of indicating that the selected alphanumeric objects should be compacted can be accomplished in a variety of manners. For example, instead of "clicking" at point 84, the border (roundup box) 82 can be simply "tapped" at that point 84. By "tapped" it is meant that the tip of stylus 38 is engaged with the border 82, but is not rapidly removed from the border 82. In addition, there are many other methods for indicating that the selected alphanumeric objects should be compacted, such as by pressing a button, providing a written or typewritten command, etc.

However, a "click" or a "tap" on the border is a compaction command that is particularly well adapted for the present invention. It is a stylus-oriented type command, is very easy to use, and is particularly well adapted to the types of visual displays used in the pen-based computer of the preferred embodiment of the present invention.

FIG. 3d illustrates the paragraph 73' after it has been compacted by the method and apparatus of the present invention. The alphanumeric objects are still highlighted as indicated by reverse video 80', and they are still surrounded by a border 82'. By continuing the selection of the paragraph 73', other formatting operations, such as changing the left or right margin of the paragraph 73', or moving the entire paragraph 73' in a dragging process, can be accomplished. These other types of reformatting or editing processes are not germane to the discussion of the present invention, and will not be discussed further herein.

FIG. 3e illustrates the compacted paragraph 73' after the highlighting has been de-selected. In the present invention, the highlighting of FIG. 3d is de-selected by clicking on the screen 52 outside or inside of the border 82' as indicated, by example, at 86. This tells the computer 10 to cause the reverse video 80 to become regular video, and to remove the border 82'. The "rounded up" or compacted paragraph then has the formatted appearance as illustrated in FIG. 3e.

In FIG. 4a, two paragraphs 88 and 90 are shown as they may be displayed on the screen 52 of computer 10. Paragraph 88 includes three alphanumeric objects A1, A2, and A3, and paragraph 90 includes the single alphanumeric object A4. These two paragraphs 88 and 90 are widely separated in the vertical direction, and are treated as two different paragraph objects by the computer system 10. The two paragraphs 88 and 90 can be considered to be separated by a hidden "paragraph object break."

In FIG. 4b, the paragraphs 88 and 90 are shown after they have been "selected" by any suitable process. Again, in this instance, this selection is indicated by the reverse video depictions 92 and 94 of the paragraphs 88 and 90, respectively, as well as the round-up box or border 96 formed around the two paragraphs 88 and 90. The border 96 will have left and right sides which closely approximate the left and right default margins for a combined paragraph. A click of stylus 38 anywhere on the border 96 (for example, at point 98) will result in the rounding-up or compaction of the selected alphanumeric objects into a single compacted paragraph 100 as illustrated in FIG. 4c. The left, right, and top sides of border 96 will remain the same as they were depicted in FIG. 4b, but the bottom side of border 96 will be moved up to reflect the compaction of the paragraph 100. FIG. 4d illustrates the compacted paragraph 100 after being clicked at any position outside of the border 96, as shown at 102 in FIG. 4c.

Figure 5:
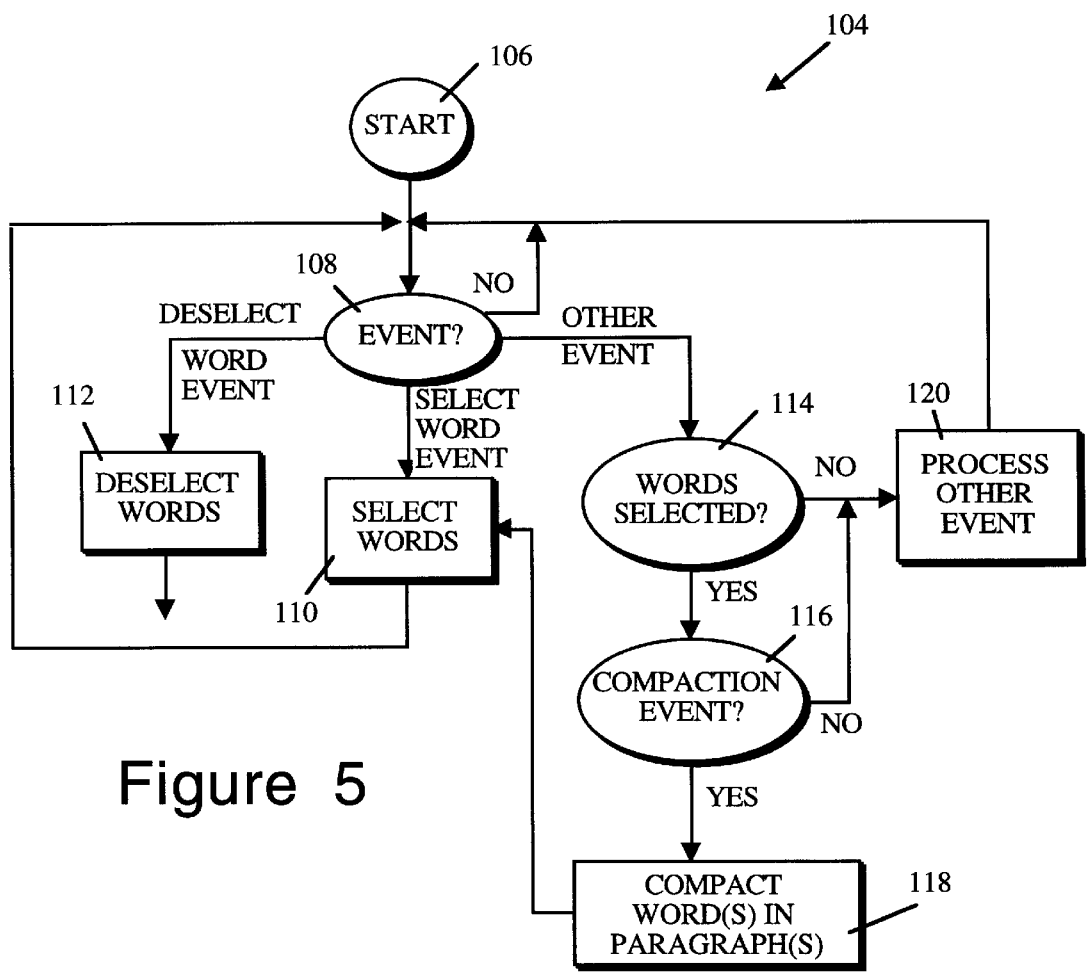
FIG. 5 is a flow diagram of a computer-implemented process of the present invention for compacting alphanumeric objects on the screen of a computer system.

FIG. 5 illustrates a computer-implemented process 104 in accordance with the present invention which implements the aforementioned paragraph compaction process. The process 104 begins at 106 and, in an event loop 108, determines whether there is an event occurring in the computer system 10. As used herein, "event" means a user or system-generated event which can affect the process flow in the computer system 10. For example, a "click" or "tap" of the tip of stylus 38 on the screen 52 is an event. Of course, there are many other types of events possible, such as system-generated events (e.g., a low battery indicator event), externally-generated events (such as information coming in over the I/R port 28, keypad events on keypad 24, etc.). However, in this preferred embodiment, the events most pertinent to the process 104 of the present invention are clicking and tapping events of the stylus 38 against the screen 52.

If no event has occurred, the event loop 108 goes into a wait state to await the next event. If a "select word" event is detected, a step 110 selects the words and then returns process control to the event loop 108. As mentioned previously, the term "words" will be used synonymously with the alphanumeric objects in this description. If the event loop 108 detects a "de-select word" event, a step 112 will de-select the words and will then return process control to event loop 108. In the present invention, as described previously, the "de-select word" event is a click of the stylus 38 on the screen 52 outside (or inside) of a border (e.g., border 82' of FIG. 3d) that surrounds a selected paragraph. This word de-selection step 112 comprises the removal of the border from around the paragraph and the reversing of the reverse video mode for the de-selected words.

If the event loop 108 detects an "other" event, a decision step 114 determines whether there are selected words associated with the event. If not, the event is not associated with the compaction process of the present invention, and this "other" event is processed in step 120, and process control is returned to the event loop 108. The processing of "other" events in step 120 is not germane to the present invention, and will not be discussed herein.

If event loop 108 has detected an "other" event, and if decision step 114 determines that this "other" event is associated with the selected words on screen 52, a step 116 determines whether this "other" event is a "compaction" event. If not, process control returns to the "process other event" step 120 and from there to the event loop 108. However, if decision step 116 determines that it is a compaction event, the words in the paragraphs that have been selected will be compacted in a step 118. The compacted words in the paragraphs will then be selected in a step 110, and process control will return to the event loop 108 to await another event.

Figure 6:
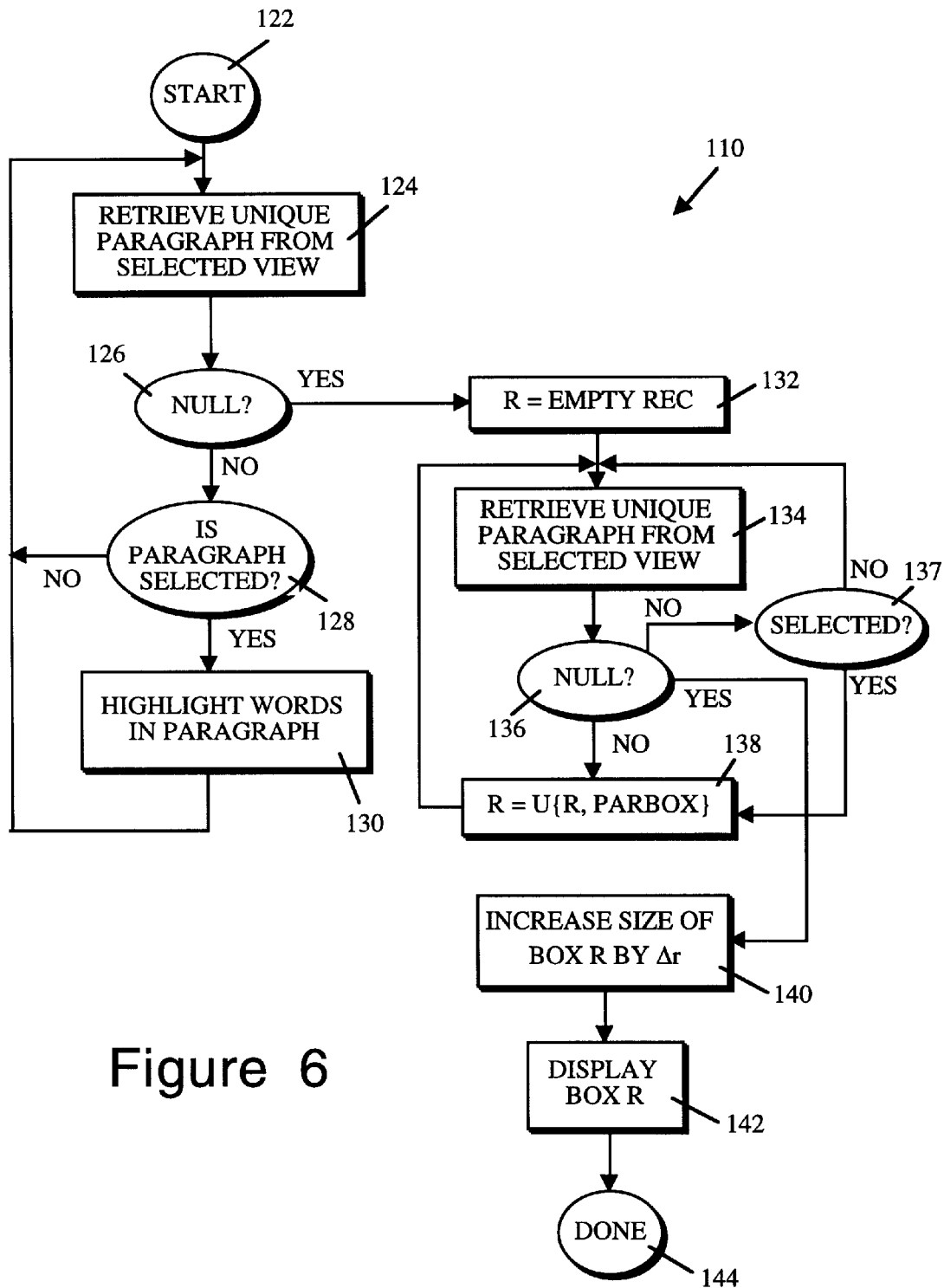
FIG. 6 is a flow diagram illustrating the "SELECT WORDS" step of FIG. 5.

FIG. 6 illustrates the "select words" step 110 of FIG. 5. The computer-implemented process 110 begins at 122 and, in a step 124, a unique paragraph is retrieved from the selected view. As mentioned previously, the computer system 10 is preferably implemented in a view system which handles, in a convenient fashion, the various images depicted on screen 52. By "selected view" it is meant the current image which is depicted on the screen 52. In FIG. 2, the "selected view" is the notepad having notepad areas 54a and 54b. Other views are, of course, possible. By "unique paragraph" it is meant that a singular, unique paragraph is retrieved each time by step 124. This function is handled by the view system of the present invention, which can simply be queried for all paragraphs within a selected view. The view system query process allows the step 124 to ask for a unique paragraphs one-by-one until a "NULL" paragraph is indicated by the view system. In this way, step 124 can be ensured of retrieving each unique paragraph from the selected view, even though it does not know the actual number of paragraphs in the selected view.

In decision step 126, it is determined whether a "NULL" paragraph has been retrieved by step 124 indicating that there are no more paragraphs to retrieve from the selected view. If not, a step 128 determines whether the retrieved paragraph has been selected. If not, process control returns to step 124. If the paragraph has been selected, the words are highlighted in the paragraph in a step 130, and process control returns to step 124.

If decision step 126 determines that all of the paragraphs from the selected view have been retrieved, a rectangle R is assigned the value "EMPTYREC" to provide a beginning or seed rectangle for a border which will ultimately enclose the selected paragraph(s). Rectangle R will be referred to herein as the "Roundup Rectangle", which will ultimately be used to produce the roundup-box or border around the selected paragraph(s). Next, in a step 134, a unique paragraph is again retrieved from the selected view. As was the case with step 124, this can be accomplished by simply querying the view system for unique paragraphs of the selected view until the view system returns a NULL value.

A decision step 136 determines whether a NULL value has been received as a result of the retrieval step 134. If step 136 determines that it is not a NULL, a step 137 determines whether the paragraph has been selected. If not, process control is returned to step 134, and if it has been selected, process control is turned over to step 138.

In step 138, the size of the rectangle R is increased by reassigning it the value of the union of the previous rectangle R and of the size of the bounding box of the selected paragraph PARBOX to the value of rectangle R. In other words, the rectangle R is increased by the size of the new selected paragraph. Process control is then returned to step 134.

When decision step 136 determines that a NULL has been returned by the view system, a step 140 increases the size of box R by a small amount Δr. This provides a buffer between the border and the highlighted words of the paragraph and defines the dimensions of the roundup-box or border. The roundup-box or border is then displayed in the step 142 (such as by a QUICKDRAW command), and the process 110 is completed at 144. It is therefore to be noted that the combination of steps 130 and 142 produce the highlighting and border, such as the highlighting 80 and border 82 of FIG. 3c.

Figure 7:
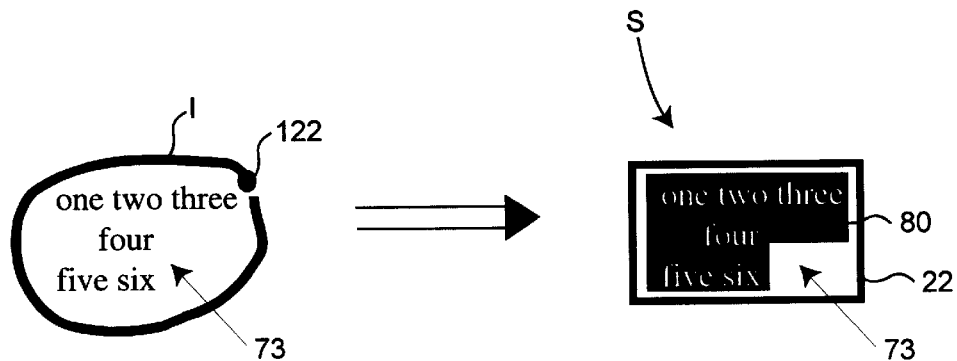
FIG. 7 is an illustration used to describe the "IS PARAGRAPH SELECTED?" step of FIG. 6.

FIG. 7 illustrates a preferred method for selecting paragraphs which can be used in conjunction with the method of the present invention. A computer-implemented process for implementing the method illustrated in the left-hand portion of FIG. 7 is described in copending U.S. patent application Ser. No. 07/888,741, filed May 26, 1992 on behalf of Stephen P. Capps, entitled "SELECTING OBJECTS ON A COMPUTER DISPLAY", assigned to the assignee of the present invention, and incorporated herein by reference in its entirety. Briefly, a paragraph 73 can be selected by pressing the tip of a stylus 38 against the screen 52 such as at a point 122 until the ink i on the screen goes into a "highlighter" mode. When in the highlighter mode, the paragraph 73 is encircled by the ink I to indicate selection as shown at S in FIG. 7.

Figure 8A:
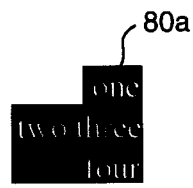
FIGS. 8a and 8b are used to further illustrate the process of FIG. 8.
Figure 8B:
Figure 8:
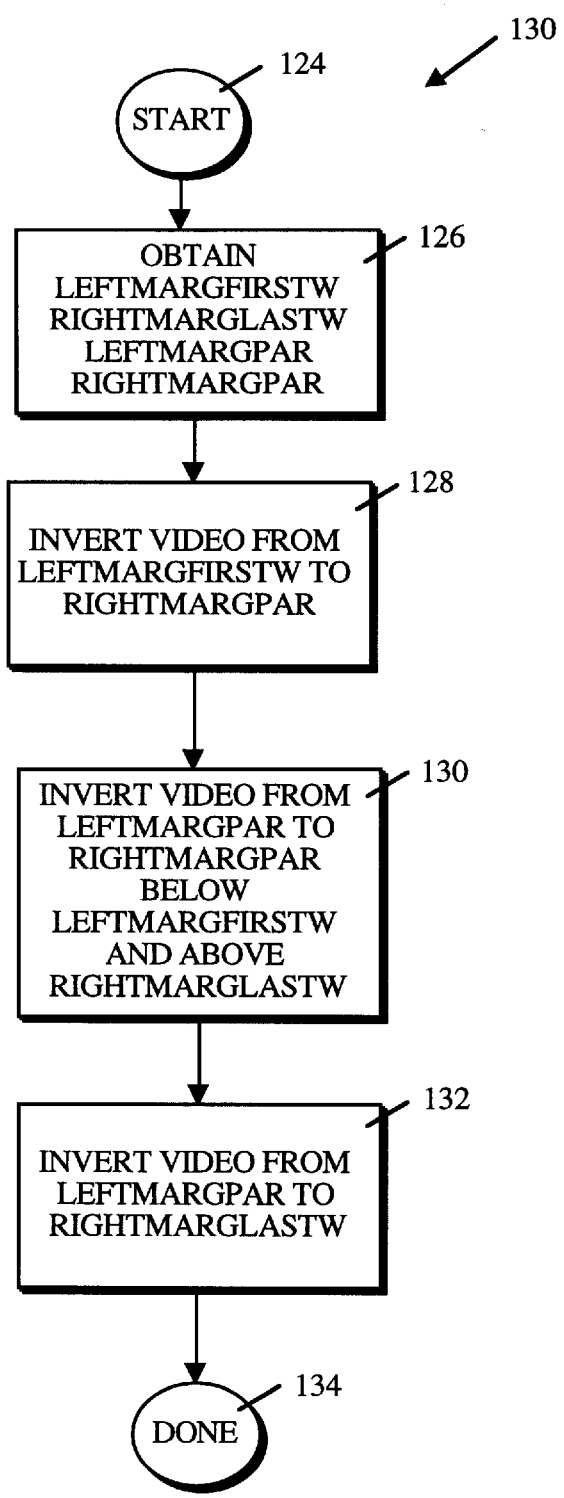
FIG. 8 is a flow diagram illustrating the "IS PARAGRAPH SELECTED?" step of FIG. 6.

In FIG. 8, the step 130 "HIGHLIGHT WORDS IN PARAGRAPH" of FIG. 6 is illustrated. The process 130 begins at 124 and, in a step 126, various variables pertaining to a selected paragraph are obtained. These variables can be obtained by a simple query to the paragraph object, as is well known to those skilled in the art. Some of these variables include the left margin of the paragraph "LEFTMARGPAR", the right margin of the paragraph "RIGHTMARGPAR", the left margin of the first word "LEFTMARGFIRSTW", and the right margin of the last word in the paragraph "RIGHTMARGLASTW". Next, in a step 128, the video is inverted from LEFTMARGFIRSTW to RIGHTMARGPAR. Again, this video inversion is easily accomplished using QUICKDRAW commands. Next, in a step 130, the video is inverted from LEFTMARGPAR to RIGHTMARGPAR below LEFTMARGFIRSTW and above RIGHTMARGLASTW. Finally, in a step 132, the video is inverted from LEFTMARGPAR to RIGHTMARGLASTW. The process 130 is then completed at 134.

The process 130 will highlight the words in a paragraph as illustrated in FIG. 7 if the words in the paragraph are left-justified. If the words in the paragraph are right-justified, they will highlight the words in the paragraph as indicated in FIG. 8a, and if the words in the paragraph are center justified they will highlight the words in the paragraph as indicated in FIG. 8b. Thus, the process 130 is valid for three major justification modes: left-justified, right-justified, and center-justified. The process 130 accomplishes this task by highlighting in three stages, namely highlighting the first line, highlighting all of the middle lines, and highlighting the last, as separate steps occurring in steps 128, 130, and 132, respectively. Therefore, the highlighting process 130 can produce highlights such as the left-justified highlights 80 of FIG. 7, the right-justified highlights 80a of FIG. 8a, and the center-justified highlights 80b of FIG. 8b.

In FIG. 9, step 116 of FIG. 5 is illustrated. The computer-implemented process 116 is relatively straightforward: the process begins in a step 136 and, in a step 138, the coordinates of the click of the tip of stylus 38 on the screen 52 are obtained. Next, in a step 140, it is determined whether the coordinates of the click are within the roundup box (i.e. border) perimeter. This roundup box is the previously calculated rectangle R. In other words, step 140 determines whether the click is within the perimeter portion of the border surrounding the highlighted paragraph and, if so, process control is returned to step 118 of FIG. 5. If not, process control is returned to step 120 of FIG. 5. Again, the step 138 of obtaining the coordinates of the click and the step 140 of determining whether the coordinates of the click are within the perimeter of the border surrounding the highlighted paragraph are easily accomplished using view system and QUICKDRAW commands.

Figure 10:
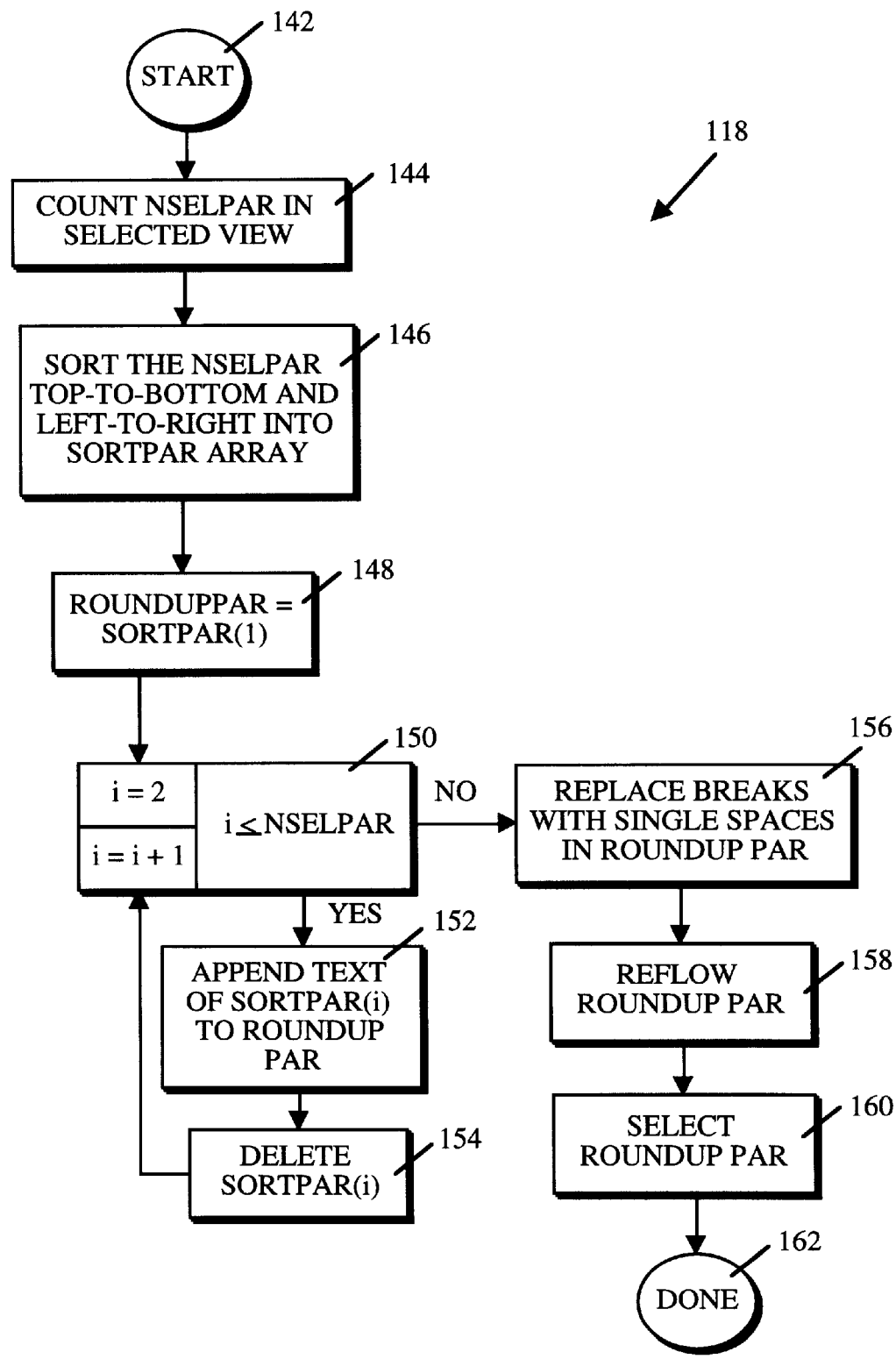
FIG. 10 is a flow diagram illustrating the "COMPACT WORDS IN PARAGRAPHS" step of FIG. 5.

In FIG. 10, step 118 "compact words in paragraphs" is illustrated. Process 118 begins at 142 and, in a step 144, counts the number of selected paragraphs "NSELPAR" in the selected view. Again, the selected view is simply the current view displayed on screen 52. Next, in a step 146, the NSELPAR selected paragraphs are sorted top-to-bottom and left-to-right into the sorted paragraph array. In a step 148, the round-up paragraph ROUNDUPPAR is set to the first sorted paragraph in the array SORTPAR(1). Next, in an iterative loop step 150, a counter is initialized to two, and is then compared to the number of selected paragraphs in SELPAR. If the counter i is less than or equal to NSELPAR, a step 152 appends the text of the ith instance of SORTPAR to the round-up paragraph ROUNDUPPAR. Next, in a step 154, SORTPAR(i) is deleted, and process control is returned to the iterative loop step 150 to increment the counter i by one. The loop 150-154 is therefore repeated until i is greater than NSELPAR, at which time a step 156 replaces the breaks between the words with single spaces in the round-up paragraph ROUNDUPPAR. Next, in a step 158, the round-up paragraph ROUNDUPPAR is reflowed and, in a step 160, the round-up paragraph ROUNDUPPAR is selected. The process is then completed at 162.

FIG. 11 illustrates step 144 "COUNT NSELPAR IN PAR ARRAY". The computer-implemented process 144 begins at 164 and, in a step 166, the variable NSELPAR is initialized to zero. Next, in a step 168, a unique paragraph is retrieved from the current view and, if it is not a NULL, it is determined in a step 171 whether it is selected. If yes, the variable NSELPAR is incremented by one in a step 172 and process control is returned to step 168. If the paragraph is not selected as determined by step 171, process control is returned to step 168. The loop 168–172 is repeated until all of the paragraphs from the current view have been retrieved, as indicated by a NULL returned by the view system, at which time the process is completed at 174.

Figure 12:
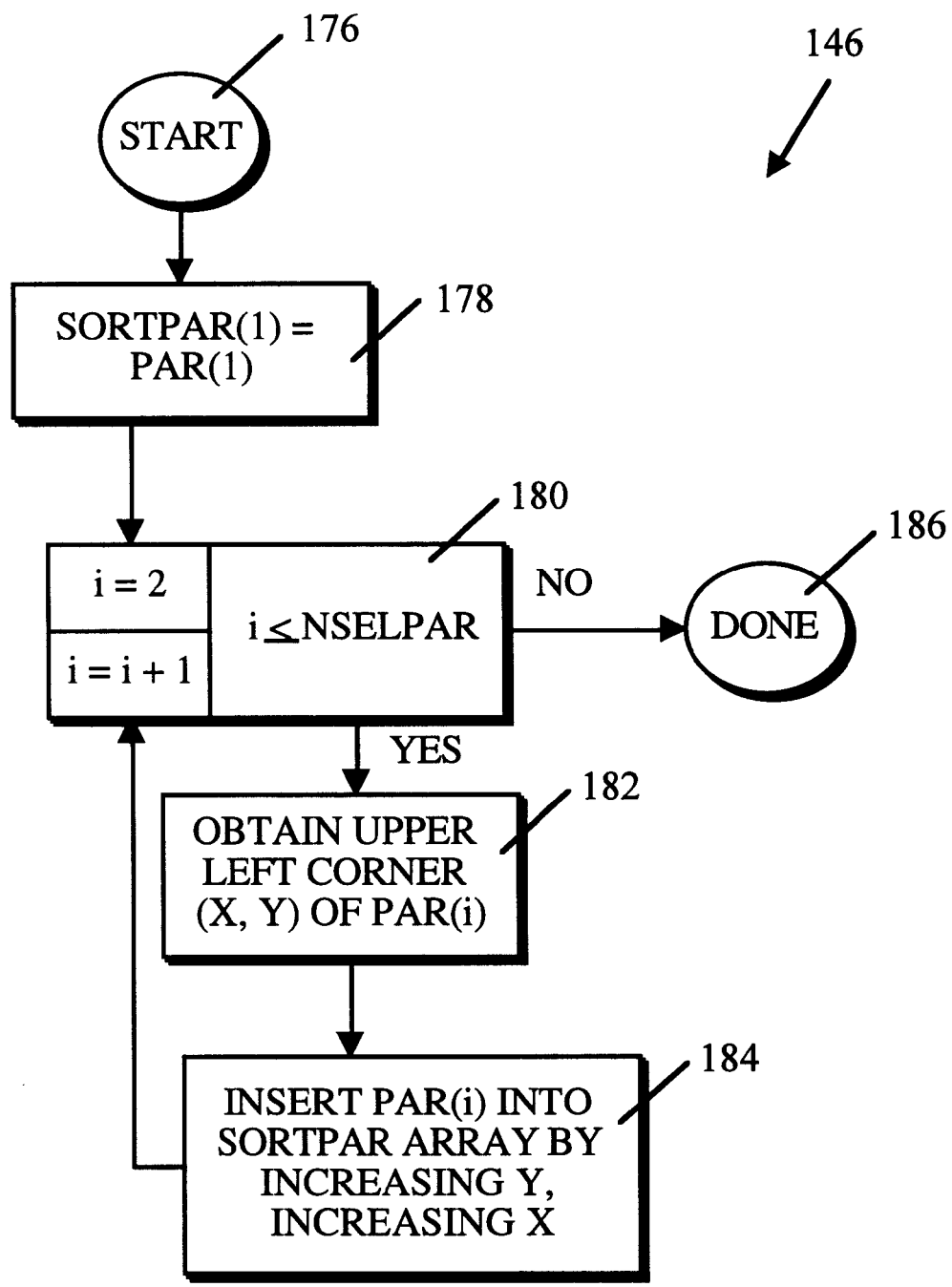
FIG. 12 is a flow diagram illustrating the "SORT THE NSELPAR" step of FIG. 10.

FIG. 12 illustrates step 146 "SORT THE NSELPAR" in greater detail. The process 146 begins at 176 and, in a first step 178, the first instance of the array SORTPAR is assigned the value of PAR(1). Next, in an iterative loop step 180, a counter i is initialized to 2 and is compared to the variable NSELPAR. If the counter i is less than or equal to NSELPAR, a step 182 obtains the upper left corner (X,Y) of PAR(i). Next, in a step 184, PAR(i) is inserted into the SORTPAR array by increasing y, increasing x values. Process control is then returned to iterative loop 180 where the counter i is incremented. The process of steps 180–184 are repeated until i is greater than NSELPAR, at which time the process is completed at 186.

Figure 12A:
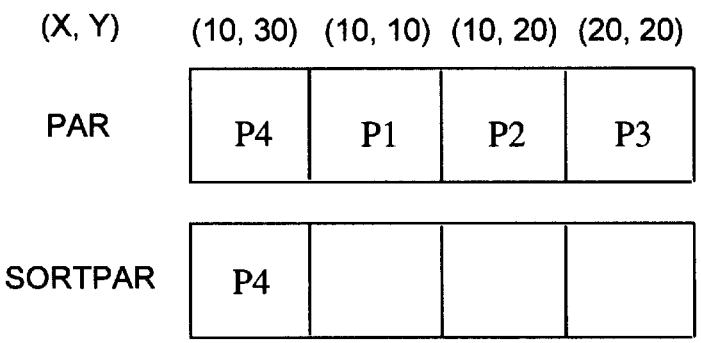
FIGS. 12a–12d are used to illustrate the process of FIG. 12.
Figure 12B:
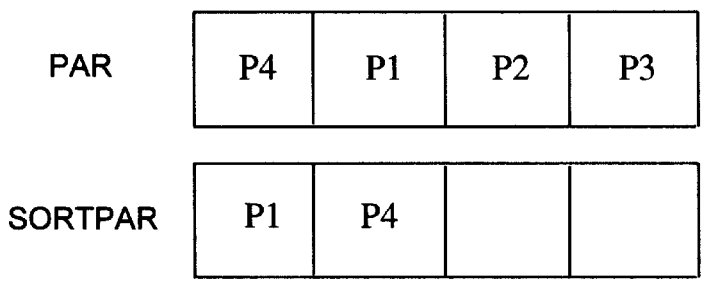
Figure 12C:
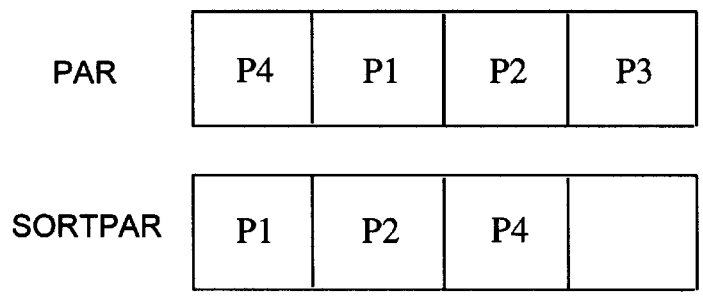
Figure 12D:
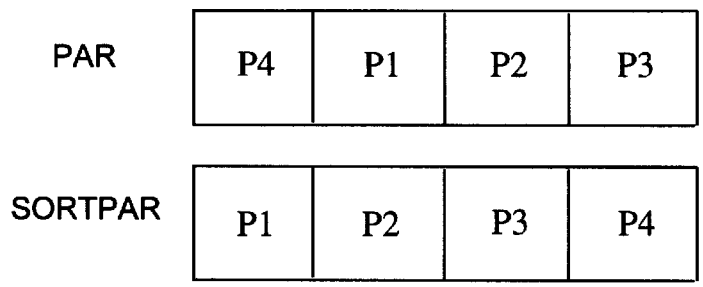

FIGS. 12a–12d illustrate the sorting process 146 of FIG. 12 by way of example. In FIG. 12a, PAR(1) equals P4, PAR(2) equals P1, PAR(3) equals P2, and PAR(4) equals P3. In this example, let's assume that the (X,Y) position of the upper left-hand corners of the paragraph objects are as indicated in FIG. 12a, namely P1 is (10,10), P2 is (10,20), P3 is (20,20), and P4 is (10,30). These coordinates are exemplary QUICKDRAW coordinates, in which Y values increase from top to bottom on the screen 52, and in which X values increase from left to right on the screen 52. Step 178 of FIG. 12 assigns SORTPAR(1) to PAR(1), which in this instance is P4. Next, in FIG. 12b, PAR(2) is obtained and the left upper corner X,Y is determined. Since paragraph object P1 is higher on the screen 52 (i.e. lower "Y") than paragraph object P4, it is sorted in front of paragraph object P4 in the SORTPAR array in FIG. 12b. Next, in FIG. 12c, PAR(3), i.e., paragraph object P2 has its upper left-hand corner X,Y obtained and compared to the upper left-hand corners of the other paragraph objects in SORTPAR and is sorted into its proper position, which in this instance is between paragraph objects P1 and P4, because it is below P1 and because it is above P4. Finally, PAR(4) in FIG. 12d is likewise sorted into the SORTPAR array by increasing Y increasing X such that it is placed between paragraph objects P2 and P4. This is because paragraph object P3 is to the right of paragraph object P2, and it is above paragraph object P4.

FIGS. 13a–13c are used to illustrate the process of the iterative loop step 150 of FIG. 10. In FIG. 13a, there are two paragraphs 188 and 190 shown including, collectively, alphanumeric objects A1–A8. The iterative loop comprising steps 150–154 of FIG. 10 will, for the number of selected paragraphs (two in this example), append the sorted paragraph to the round-up paragraph. Step 148 initializes the ROUNDUPPAR to SORTPAR(1) as illustrated in FIG. 13b. The value of SORTPAR(2) was previously assigned in step 146. The text of SORTPAR(2) is then appended to ROUND-UPPAR to produce the string as illustrated in FIG. 13c where all of the alphanumeric objects A1–A8 are appended. It should be noted that while all of the alphanumeric objects are appended, all of the object breaks including carriage returns, tabs, etc. (except paragraph breaks which are replaced with spaces) remain, at this point, in the round-up paragraph.

FIG. 14 illustrates step 156 "REPLACE BREAKS" of FIG. 10. In this step, all of the object breaks have been replaced with single spaces between adjacent alphanumeric objects. A NULL (which is automatically placed by the system and which was always present at an end of a string in preceding steps) is shown at the end of the string in FIG. 14. It should be noted that there are single spaces in between alphanumeric objects even though there may have been multiple object breaks between words. For example, in FIG. 13c, between alphanumeric objects A2 and A3 are both a carriage return and a tab break. These two object breaks have been replaced with a single space between the alphanumeric objects A2 and A3 in FIG. 14.

Figure 15:
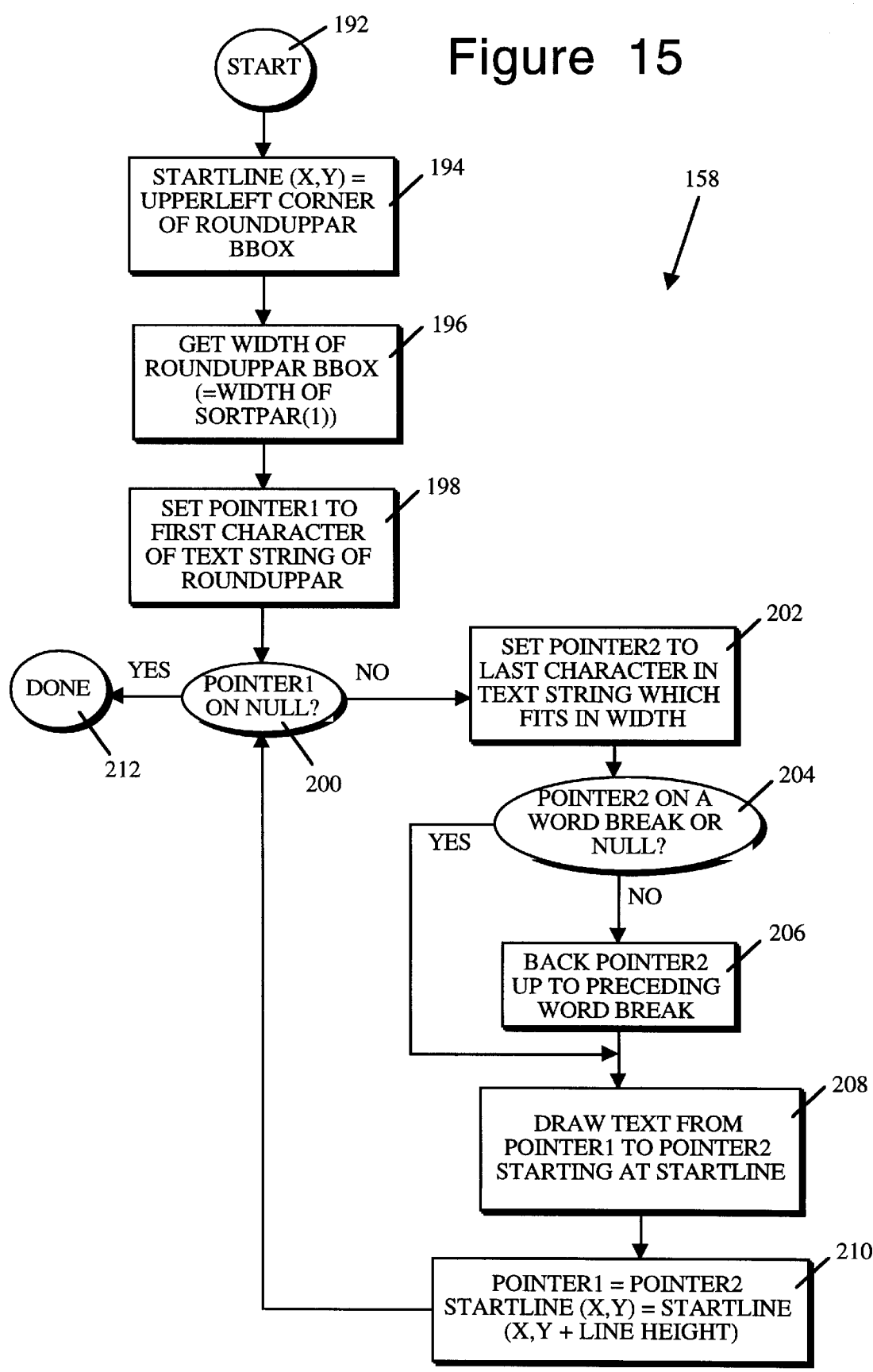
FIG. 15 is a flow diagram illustrating the "REFLOW ROUNDUP PARAGRAPH" step of FIG. 10.

In FIG. 15, the step 158 "REFLOW ROUNDUP PARAGRAPH" of FIG. 10 is illustrated in greater detail. The process 158 begins at 192 and, in a first step 194, the start line X,Y coordinates are set to the upper left corner of the round-up paragraph bounding box. Next, in a step 196, the width of the round-up paragraph bounding box (i.e., the width of the first sorted paragraph in the SORTPAR array) is obtained. Again, the information required for steps 194 and 196 are easily obtained from the view system of the present invention. Next, in a step 198, POINTER1 is set to the first character of the first text string of the round-up paragraph. Next, in a step 200, it is determined if POINTER1 is on a NULL. If not, a step 202 sets POINTER2 to the last character in the text string which fits in the width of the round-up paragraph box as determined by step 196. Next, it is determined in the step 204 if POINTER2 is on a WORD BREAK or on a NULL. If neither, POINTER2 is backed up to the preceding WORD BREAK in a step 206. If POINTER2 is on a word break or on a NULL, or after step 206, a step 208 draws text from POINTER1 to POINTER2 starting at the position STARTLINE as determined by step 194. Next, in a step 210, POINTER1 is assigned the value of POINTER2, the STARTLINE X,Y position is set to the STARTLINE X,Y position plus the LINE HEIGHT, and process control is returned to step 200. The loop 200–210 is repeated until POINTER1 is on a NULL as determined by step 200. At this point, the process 158 is completed as indicated at 212.

Figure 16A:
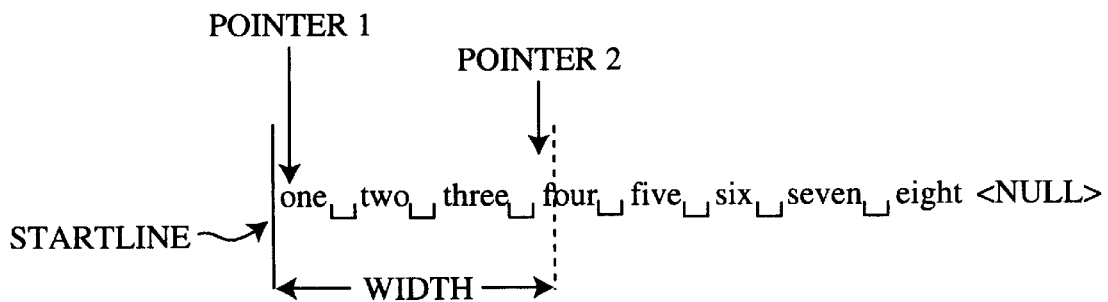
FIGS. 16a–16c are used to illustrate the process of FIG. 15.
Figure 16B:
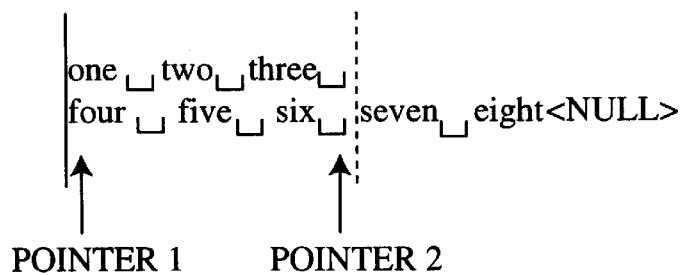
Figure 16C:
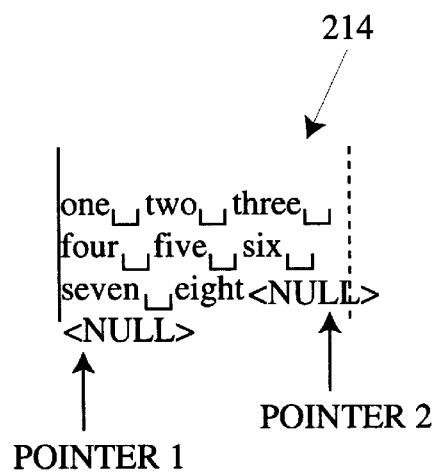

This process 158 is illustrated by example in FIGS. 16a–16c. Here, the string produced in FIG. 14 is passed to the QUICKDRAW system with the variable width as determined by step 196 and the position of POINTER1. QUICKDRAW will return the position of POINTER2 which, in a step 204, is determined to be not on a WORD BREAK or a NULL. Therefore, POINTER2 is backed up to the space between the words "three" and "four", and text is drawn from POINTER1 to POINTER2 starting at STARTLINE. This can be seen in the first line in FIG. 16b. The process is then repeated with the remainder of the string beginning with "four" where it is determined that POINTER2 for this remaining text string is on a WORD BREAK. In this instance, the POINTER2 does not have to be backed up, the text is drawn from POINTER1 to POINTER2 as illustrated in FIG. 16c, and the process is continued for the remainder of the text string. The process 158 will therefore go through the loop 200–210 three times before it is determined by step 200 that POINTER1 is on a NULL, at which time the process is completed at 212. The end of this process 158 is to produce the "ROUNDED-UP" or compacted paragraph 214 as illustrated in FIG. 16c.

While this invention has been described in terms of several preferred embodiments, there are alterations, permutations, and equivalents which fall within the scope of this invention. It should also be noted that there are may alternative ways of implementing the processes of the present invention. For example, much of the programming can be simplified by using the high-level utilities and data structures mentioned in the preceding specification. In particular, the described view system is preferred for simplifying the programming tasks required by the computer implemented processes of the present invention, but there are many other database and graphics systems which can be used to accomplish the same task.

It is therefore intended that the following appended claims be interpreted as including all such alterations, permutations, and equivalents as fall within the true spirit and scope of the present invention.

What is claimed is:

1. A method for reformatting objects displayed on a screen of a computer system comprising the steps of:

selecting a plurality of objects on said screen to be reformatted, wherein sequentially adjacent objects of said plurality of objects may be separated by one or more object breaks, said selecting step resulting in the provision of a visually modified area on the screen corresponding to said objects selected in said selecting step;

providing a border on said screen surrounding said objects selected in said selecting step, said border being buffered a distance away from said visually modified area on the screen;

at least momentarily engaging a pointing means at least approximately on said border on the screen to provide an indication that said plurality of objects are to be reformatted, and subsequently removing said object breaks from between said objects in response to said indication; and reformatting said objects without said removed object breaks.

2. A method for reformatting objects as recited in claim 1 wherein said plurality of objects include a plurality of alphanumeric objects.

3. A method for reformatting objects as recited in claim 2 wherein said object breaks include carriage returns.

4. A method for reformatting objects as recited in claim 3 wherein said object breaks further include tabs.

5. A method for reformatting objects as recited in claim 3 wherein said object breaks further include paragraph breaks.

6. A method for reformatting objects as recited in claim 3 further comprising the step of inserting a space between an adjacent pair of alphanumeric objects if one or more object breaks have been removed prior to said reformatting step.

7. A method for reformatting objects as recited in claim 3 wherein said step of reformatting said objects includes reformatting said alphanumeric objects such that said alphanumeric objects are located between a left margin and a right margin.

8. A method for reformatting objects as recited in claim 1 wherein said step of selecting a plurality of objects comprises the step of:

selecting which objects are to be reformatted on a screen of a pen computer system with a stylus, wherein said pointing means comprises said stylus; and wherein said removing of said object breaks from between said objects is initiated by at least momentarily engaging said stylus at least approximately on said border.

\* \* \* \* \*